US012725946B2

(12) United States Patent
Henry et al.

(10) Patent No.: US 12,725,946 B2
(45) Date of Patent: Sep. 1, 2026

(54) RECEPTACLE COUPLER FOR COMMUNICATION SYSTEM

(71) Applicant: TE Connectivity Services GmbH, Schaffhausen (CH)

(72) Inventors: Randall Robert Henry, Lebanon, PA (US); Brandon Michael Matthews, McAlisterville, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 143 days.

(21) Appl. No.: 17/232,188

(22) Filed: Apr. 16, 2021

(65) Prior Publication Data

US 2022/0336976 A1 Oct. 20, 2022

(51) Int. Cl.

| | |
|---|---|
| ***H01R 12/70*** | (2011.01) |
| ***H01R 12/71*** | (2011.01) |
| ***H01R 12/72*** | (2011.01) |
| ***H01R 13/502*** | (2006.01) |
| ***H01R 13/516*** | (2006.01) |
| *H01R 24/54* | (2011.01) |

(52) U.S. Cl.

CPC ..... *H01R 12/7005* (2013.01); *H01R 12/7082* (2013.01); *H01R 12/716* (2013.01); *H01R 12/721* (2013.01); *H01R 13/502* (2013.01); *H01R 13/516* (2013.01); *H01R 12/72* (2013.01); *H01R 24/54* (2013.01); *H01R 24/542* (2013.01)

(58) Field of Classification Search

CPC ............ H01R 12/7005; H01R 12/7082; H01R 12/716; H01R 12/721; H01R 13/502; H01R 13/516; H01R 12/72; H01R 24/54; H01R 24/542

See application file for complete search history.

(56) References Cited

U.S. PATENT DOCUMENTS 3,500,295 A * 3/1970 Walter ................. H01R 12/716 439/701
8,628,350 B2 1/2014 Briant et al.
9,705,258 B2 * 7/2017 Phillips .................. H01R 12/71
(Continued)

FOREIGN PATENT DOCUMENTS

CN 108173018 A * 6/2018 ........... H01R 12/721
JP 2013157159 A 8/2013

OTHER PUBLICATIONS

Chinese Office Action, dated Jul. 4, 2026 in Application No. 202210385856X, 8 pages.

*Primary Examiner* — Justin M Kratt

(57) ABSTRACT

A receptacle coupler includes a coupler contact assembly having upper and lower contacts each having a front mating beam configured to mate with a front module circuit board and a rear mating beam configured to mate with a rear module circuit board with an intermediate portion therebetween. The coupler contact assembly includes a contact holder holding the upper and lower contacts. The receptacle coupler includes a coupler housing having a contact chamber receiving the coupler contact assembly and front and rear receptacles configured to receive the module circuit boards. The coupler housing holds the coupler contact assembly with the front mating beams in the front receptacle for mating with the front module circuit board and the rear mating beams in the rear receptacle for mating with the rear module circuit board.

19 Claims, 9 Drawing Sheets

(56) References Cited

U.S. PATENT DOCUMENTS

| | | | | |
|---|---|---|---|---|
| 9,935,385 | B2 | 4/2018 | Phillips et al. | |
| 10,418,734 | B1 * | 9/2019 | Henry | H01R 13/424 |
| 2016/0294087 | A1 | 10/2016 | Norton et al. | |

* cited by examiner

RECEPTACLE COUPLER FOR COMMUNICATION SYSTEM

BACKGROUND OF THE INVENTION

The subject matter herein relates generally to communication systems.

Communication systems are known to electrically connect various electrical components. The communication systems typically include electrical connectors to provide interfaces between the various electrical components. For example, an electrical component may be electrically connected to a circuit board through an electrical connector, mounted to the circuit board. Data is transmitted along the circuit board from the electrical connector to an electrical component or another electrical connector. Data is transmitted between circuit boards using a cable assembly having electrical connector is provided at both ends of the cable assembly. As such, a typical communication system includes multiple electrical interfaces along the data transmission path, including an interface between the component and the circuit board, an interface between the circuit board and an electrical connector, an interface between the electrical connector and a cable assembly, an interface between the cable assembly and a second electrical connector mounted to a second circuit board, and interface between the second electrical connector and the second circuit board, and an interface between the second circuit board and a second electrical component. Losses occur at each of the interfaces between the two electrical components. Additionally, losses can occur along the circuit traces of the circuit boards, particularly when the circuit traces between the electrical component and the electrical connector are long.

A need remains for a communication system having improved data transmission paths between electrical components.

BRIEF DESCRIPTION OF THE INVENTION

In one embodiment, a receptacle coupler is provided and includes a coupler contact assembly having upper contacts and lower contacts arranged in an upper array and a lower array. Each upper contact has an upper front mating beam configured to mate with a front module circuit board and an upper rear mating beam configured to mate with a rear module circuit board. Each upper contact has an upper intermediate portion between the upper front mating beam and the upper rear mating beam. Each lower contact has a lower front mating beam configured to mate with the front module circuit board and a lower rear mating beam configured to mate with the rear module circuit board. Each lower contact has a lower intermediate portion between the lower front mating beam and the lower rear mating beam. The coupler contact assembly includes a contact holder holding the upper and lower contacts. The receptacle coupler includes a coupler housing having a contact chamber receiving the coupler contact assembly. The coupler housing has a front receptacle configured to receive the front module circuit board. The coupler housing has a rear receptacle configured to receive the rear module circuit board. The coupler housing holding the coupler contact assembly such that the upper and lower front mating beams are located in the front receptacle for mating with the front module circuit board and such that the upper and lower rear mating beams are located in the rear receptacle for mating with the rear module circuit board. The coupler housing includes mounting tabs extending from the coupler housing for mounting the coupler housing to a support structure.

In another embodiment, a receptacle coupler is provided and includes a coupler contact assembly has upper contacts and lower contacts arranged in an upper array and a lower array. Each upper contact has an upper front mating beam configured to mate with a front module circuit board of a front plug connector and an upper rear mating beam configured to mate with a rear module circuit board of a rear plug connector. Each upper contact has an upper intermediate portion between the upper front mating beam and the upper rear mating beam. Each lower contact has a lower front mating beam configured to mate with the front module circuit board and a lower rear mating beam configured to mate with the rear module circuit board. Each lower contact has a lower intermediate portion between the lower front mating beam and the lower rear mating beam. The coupler contact assembly includes a contact holder holding the upper and lower contacts. The receptacle coupler includes a coupler housing having a contact chamber receiving the coupler contact assembly. The coupler housing has a front receptacle configured to receive the front module circuit board. The coupler housing has a rear receptacle configured to receive the rear module circuit board. The coupler housing holding the coupler contact assembly such that the upper and lower front mating beams are located in the front receptacle for mating with the front module circuit board and such that the upper and lower rear mating beams are located in the rear receptacle for mating with the rear module circuit board. The coupler housing includes mounting tabs extending from the coupler housing. The receptacle coupler includes an outer shroud having a coupler cavity receiving the coupler housing and the coupler contact assembly. The mounting tabs engaging the outer shroud to couple the coupler housing to the outer shroud. The outer shroud has a front shroud member and a rear shroud member. The front shroud member forming a front plug cavity configured to receive the front plug connector. The rear shroud member forming a rear plug cavity configured to receive the rear plug connector. The front shroud member has a front rail and a front track. The rear shroud member has a rear rail and a rear track. The front shroud member coupled to the rear shroud member such that the front rail is received in the rear track and such that the rear rail is received in the front track.

In another embodiment, a communication system is provided and includes a front pluggable module having a front module circuit board. The front module circuit board has a card edge. The communication system includes a rear pluggable module has a rear module circuit board. The rear module circuit board has a card edge. The communication system includes a receptacle coupler electrically coupling the front pluggable module and the rear pluggable module. The receptacle coupler includes a coupler contact assembly having upper contacts and lower contacts arranged in an upper array and a lower array. Each upper contact has an upper front mating beam and an upper rear mating beam. Each upper contact has an upper intermediate portion between the upper front mating beam and the upper rear mating beam. Each lower contact has a lower front mating beam and a lower rear mating beam. Each lower contact has a lower intermediate portion between the lower front mating beam and the lower rear mating beam. The coupler contact assembly includes a contact holder holding the upper and lower contacts. The receptacle coupler includes a coupler housing having a contact chamber receiving the coupler contact assembly. The coupler housing has a front receptacle receiving card edge of the front module circuit board. The coupler housing has a rear receptacle receiving the card edge of the rear module circuit board. The coupler housing holding the coupler contact assembly such that the upper and lower front mating beams are located in the front receptacle for mating with the front module circuit board and such that the upper and lower rear mating beams are located in the rear receptacle for mating with the rear module circuit board.

DETAILED DESCRIPTION OF THE INVENTION

Figure 1:
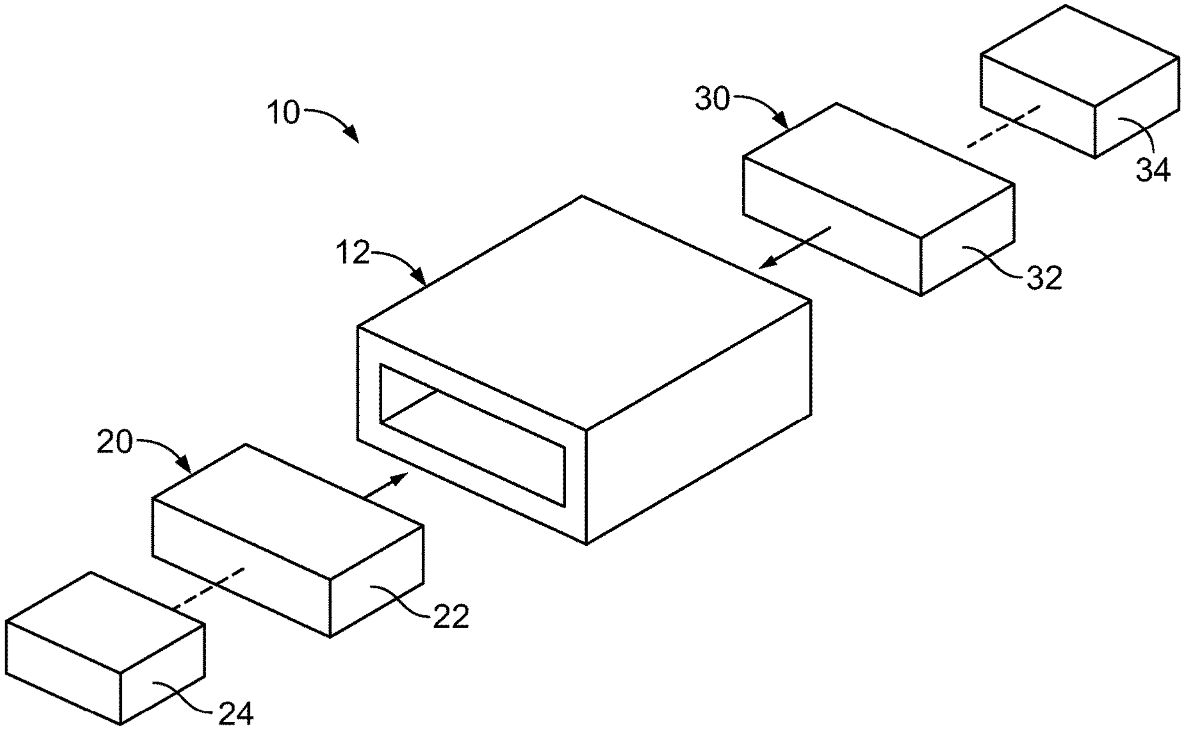
FIG. 1 is a perspective view of a communication system in accordance with an exemplary embodiment.

FIG. 1 is a schematic view of a communication system 10 in accordance with an exemplary embodiment. The communication system 10 includes a receptacle coupler 12 used to electrically connect a first pluggable module 20 with a second pluggable module 30. The first pluggable module 20 includes a first module circuit board 22 configured to be plugged into the receptacle coupler 12. The second pluggable module 30 includes a second module circuit board 32 configured to be plugged into the receptacle coupler 12. The first pluggable module 20 is electrically connected to a first component 24. The second pluggable module 30 is electrically connected to a second component 34. The receptacle coupler 12 electrically connects the first component 24 with the second component 34.

In an exemplary embodiment, the pluggable modules 20, 30 are plugged into opposite sides of the receptacle coupler 12. The pluggable modules 20, 30 are coupled to the receptacle coupler 12 at separable mating interfaces. The first pluggable module 20 may be a cable module provided at an end of a cable with the cable electrically connecting the first pluggable module 20 with the first electrical component 24. Alternatively, the first pluggable module 20 may be a card module including a circuit card plugged directly into the receptacle coupler 12 with the first electrical component 24 mounted directly to the circuit card. The second pluggable module 30 may be a cable module provided at an end of a cable with the cable electrically connecting the second pluggable module 30 with the second electrical component 34. Alternatively, the second pluggable module 30 may be a card module including a circuit card plugged directly into the receptacle coupler 12 with the second electrical component 34 mounted directly to the circuit card. Other types pluggable modules may be used in alternative embodiments.

In various embodiments, the receptacle coupler 12 may be mounted to a supporting structure, such as a panel or wall such that the receptacle coupler 12 has a fixed position to receive the first and second pluggable modules 20, 30. In other various embodiments, the supporting structure for the receptacle coupler 12 may be a shroud or housing that holds components of the receptacle coupler 12, but is freely movable and not tied to a panel or wall. For example, the receptacle coupler 12 may be positionable between the two cables associated with the pluggable modules 20, 30 to tie the pluggable modules 20, 30 together being movable with the cables to route between the electrical components 24, 34.

Figure 2:
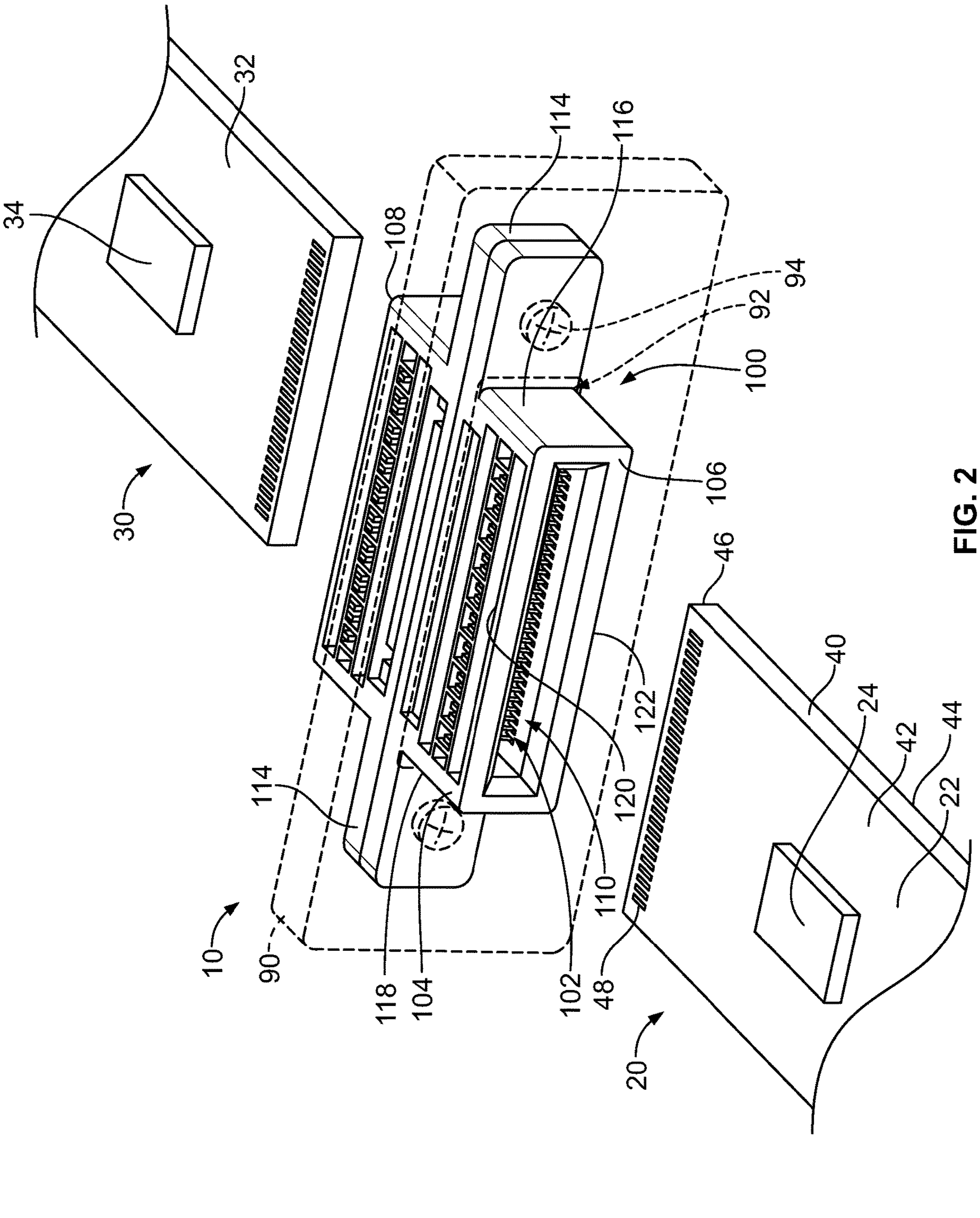
FIG. 2 is a front perspective view of the communication system including a receptacle coupler in accordance with an exemplary embodiment.
Figure 3:
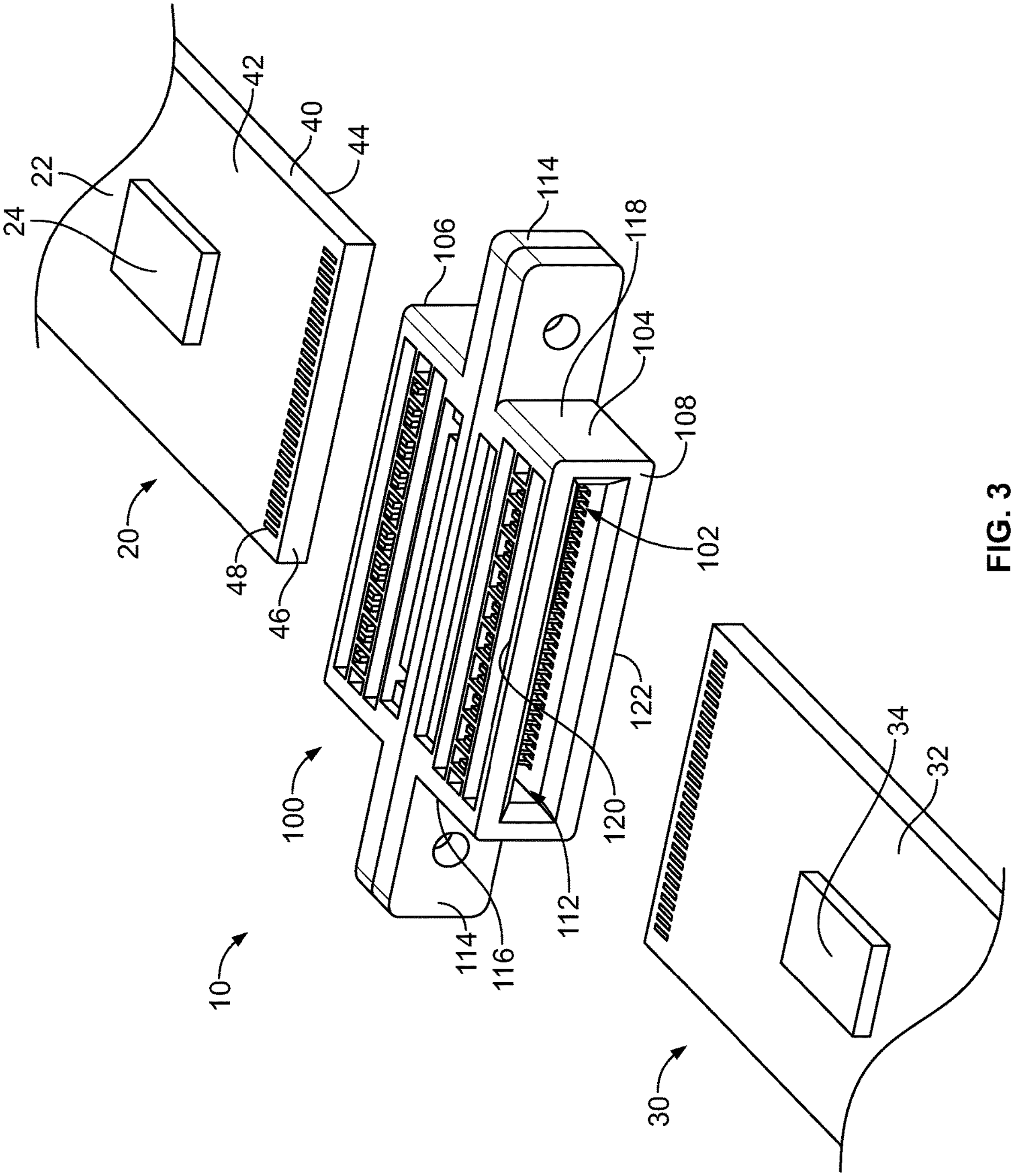
FIG. 3 is a rear perspective view of the communication system including the receptacle coupler in accordance with an exemplary embodiment.

FIG. 2 is a front perspective view of the communication system 10 including a receptacle coupler 100 in accordance with an exemplary embodiment. FIG. 3 is a rear perspective view of the communication system 10 including the receptacle coupler 100 in accordance with an exemplary embodiment. The receptacle coupler 100 is an exemplary embodiment of the receptacle coupler 12 used to electrically connect the pluggable modules 20, 30. In the illustrated embodiment, the pluggable modules 20, 30 are circuit cards configured to be directly plugged into the receptacle coupler 100. The pluggable modules 20, 30 may be similar to each other and like components may be identified with like reference numerals. In various embodiments, the first pluggable module 20 is a primary circuit card and the second pluggable module 30 is a secondary circuit card. For example, the first pluggable module 20 may be a host circuit card or a backplane and the second pluggable module 30 may be an add-on circuit card or a daughter card.

The pluggable module 20 includes a substrate 40 defining the module circuit board 22. The module circuit board 22 has an upper surface 42 and a lower surface 44. The module circuit board 22 has a card edge 46 and a mating end of the module circuit board 22. The module circuit board 22 includes a plurality of board contacts 48 at the mating end. The card edge 46 is configured to be plugged into the receptacle coupler 100 to electrically connect the board contacts 48 with the receptacle coupler 100. The module circuit board 22 includes circuits, such as traces, vias, pads and the like to electrically connect the board contacts 48 to the electrical component 24. In the illustrated embodiment, the electrical component 24 is mounted directly to the module circuit board 22, such as being soldered to the module circuit board 22. The electrical component 24 may be a processor, a chip, a memory module, or other type of electrical component. In alternative embodiments, rather than being mounted directly to the module circuit board 22, the electrical component 24 may be remote from the module circuit board 22 and electrically connected to the module circuit board 22 by a cable and/or an electrical connector.

The receptacle coupler 100 includes a coupler contact assembly 102 and a coupler housing 104 that receives the coupler contact assembly 102. The coupler housing 104 is manufactured from a dielectric material, such as a plastic material. For example, the coupler housing 104 may be a molded part molded from a plastic material. In various embodiments, the coupler housing 104 may include multiple pieces, such as a front housing member and a rear housing member coupled together to contain the coupler contact assembly 102 therebetween. In alternative embodiments, the coupler housing 104 may be a single piece housing.

The coupler housing 104 extends between a front 106 and a rear 108. The first pluggable module 20 is coupled to the receptacle coupler 100 at the front 106. The second pluggable module 30 is coupled to the receptacle coupler 100 at the rear 108. In an exemplary embodiment, the coupler housing 104 includes a front receptacle 110 (FIG. 2) at the front 106 and a rear receptacle 112 (FIG. 3) at the rear 108. The coupler contact assembly 102 extends into the front receptacle 110 and the rear receptacle 112. The front receptacle 110 defines a card slot configured to receive the card edge 46 of the first module circuit board 22. The rear receptacle 112 defines a card slot configured to receive the card edge 46 of the second module circuit board 32.

In an exemplary embodiment, the coupler housing 104 includes mounting tabs 114 extending from opposite sides 116, 118 of the coupler housing 104. The mounting tabs 114 are used to secure the receptacle coupler 100 to a support structure 90 (shown in phantom in FIG. 2). The support structure 90 may be a panel or wall having an opening 92. The coupler housing 104 may extend through the opening 92. The mounting tabs 114 are secured to the supporting structure 90 using fasteners 94 in the illustrated embodiment. Other securing means may be used in alternative embodiments, such as latches, clips, interference fit features, and the like. In alternative embodiments, the mounting tabs 114 may extend from a top 120 and/or a bottom 122 of the coupler housing 104.

Figure 4:
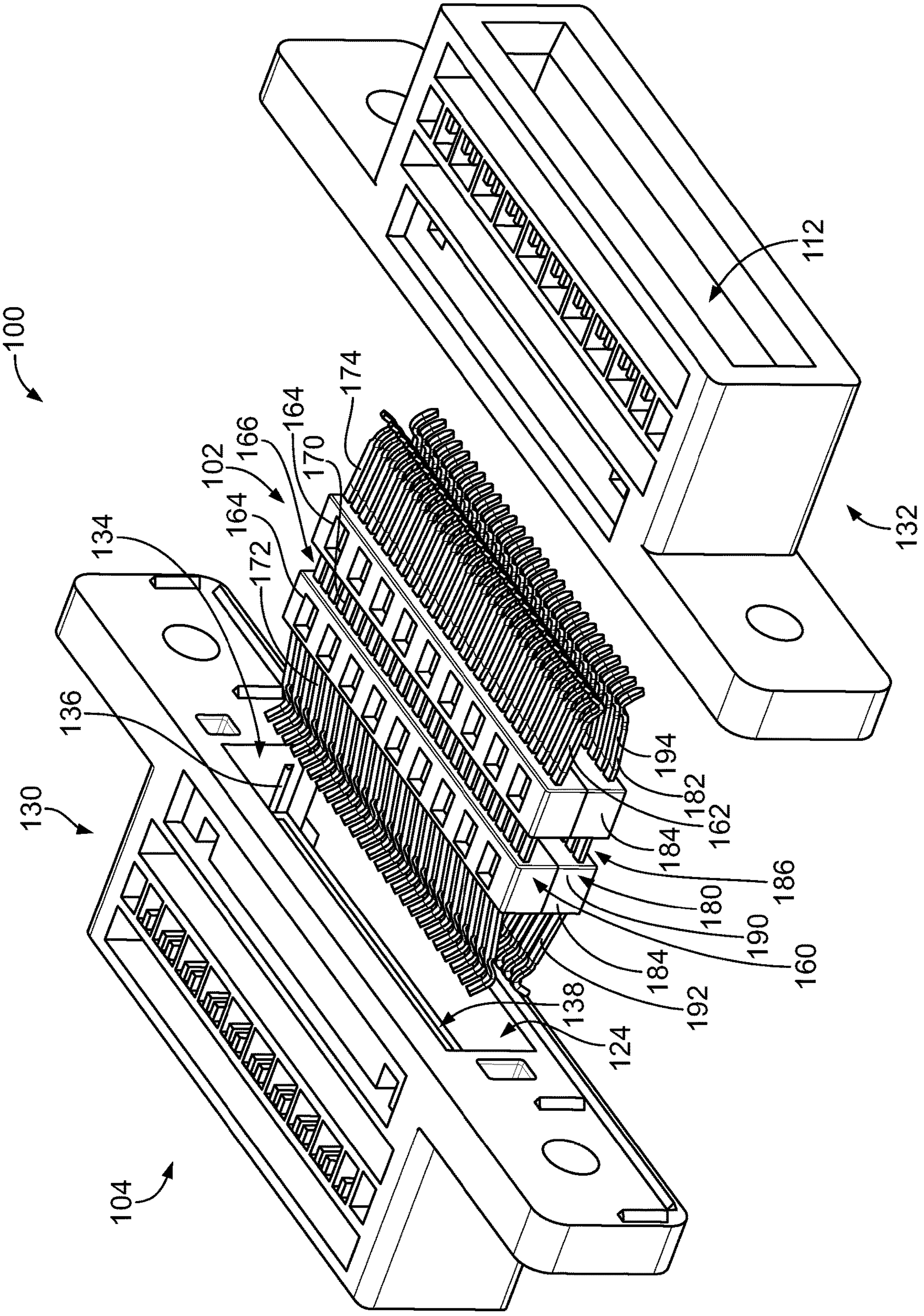
FIG. 4 is an exploded view of the receptacle coupler in accordance with an exemplary embodiment.

FIG. 4 is an exploded view of the receptacle coupler 100 in accordance with an exemplary embodiment. The coupler contact assembly 102 is configured to be received in the coupler housing 104. In an exemplary embodiment, the coupler housing 104 includes a contact chamber 124 that receives the coupler contact assembly 102. The contact chamber 124 forms the front receptacle 110 and the rear receptacle 112.

In an exemplary embodiment, the coupler housing 104 includes a front housing member 130 and the rear housing member 132. The front housing member 130 includes the front receptacle 110 and the rear housing member 132 includes the rear receptacle 112. The contact chamber 124 is formed by both the front and rear housing members 130, 132. The front housing member 130 is coupled to the rear housing member 132 at a housing interface. In various embodiments, the front and rear housing members 130, 132 may be ultrasonically welded together at the housing interface. Alternative securing means may be used in alternative embodiments, such as using fasteners, adhesive, latches, and the like. Optionally, the front housing member 130 and the rear housing member 132 may be identical to each other and inverted 180° relative to each other to face in opposite directions. For example, the front housing member 130 and the rear housing member 132 may be formed using the same mold. In alternative embodiments, the front and rear housing members 130, 132 may have different sizes and/or shapes and/or features.

In an exemplary embodiment, the front housing member 130 includes a pocket 134 rearward of the front receptacle 110. The pocket 134 forms part of the contact chamber 124. The pocket 134 is configured to receive a portion of the coupler contact assembly 102. In an exemplary embodiment, the front housing member 130 includes crush ribs 136 extending into the pocket 134. The crush ribs 136 are engaged by the coupler contact assembly 102 when loaded into the pocket 134 to position and retain the coupler contact assembly 102 in the front housing member 130. Other types of securing features may be used in alternative embodiments, such as latches or fasteners. In an exemplary embodiment, the front housing member 130 includes contact channels 138 that receive contacts of the coupler contact assembly 102. The contact channels 138 extend forward from the pocket 134, generally along the front receptacle 110. The contact channels 138 may be used to position and/or electrically isolate the contacts from each other.

The coupler contact assembly 102 includes an upper contact array 160 and a lower contact array 180. The upper contact array 160 includes a plurality of upper contacts 162 held together by one or more upper contact holders 164. In an exemplary embodiment, the upper contacts 162 may be stamped and formed contacts formed from a lead frame. The upper contact holders 164 are manufactured from a dielectric material, such as a plastic material. Optionally, the upper contact holders 164 may be overmolded over the lead frame to hold the upper contacts 162 relative to each other prior to removing the lead frame from the carrier strip formed with the lead frame during the stamping process. Alternatively, the upper contacts 162 may be individually loaded into the upper contact holders 164 during an assembly process. The lower contact array 180 includes a plurality of lower contacts 182 held together by one or more lower contact holders 184. In an exemplary embodiment, the lower contacts 182 may be stamped and formed contacts formed from a lead frame. The lower contact holders 184 are manufactured from a dielectric material, such as a plastic material. Optionally, the lower contact holders 184 may be overmolded over the lead frame to hold the lower contacts 182 relative to each other prior to removing the lead frame from the carrier strip formed with the lead frame during the stamping process. Alternatively, the lower contacts 182 may be individually loaded into the lower contact holders 184 during an assembly process. Optionally, the upper contact array 160 and the lower contact array 180 may be identical to each other and inverted 180° relative to each other to form the coupler contact assembly 102.

Each upper contact 162 includes an upper intermediate portion 170 located between an upper front mating beam 172 and an upper rear mating beam 174. The upper front mating beam 172 is configured to extend into the front receptacle 110 to mate with the first module circuit board 22. The upper rear mating beam 174 is configured to extend into the rear receptacle 112 to mate with the second module circuit board 32. The mating beams 172, 174 are deflectable. The mating beams 172, 174 have separable mating interfaces. Optionally, the mating beams 172, 174 may be curved at the separable mating interfaces and flared outward to provide a lead-in surfaces to prevent stubbing during mating. The upper contact holder 164 is coupled to the upper intermediate portion 170. The upper front mating beam 172 extends forward from the upper contact holder 164. The upper rear mating beam 174 extends rearward from the upper contact holder 164. Optionally, the upper contact holder 164 may include a front member and a rear member separated from each other by a gap 166. The upper intermediate portion 170 extends between the front member and the rear member across the gap 166. The front member is configured to be loaded into the pocket 134 of the front housing member 130 and is held in the pocket 134 by the crush ribs 136. The rear member is configured to be loaded into the pocket (not shown) of the rear housing member 132 and is held in the pocket by crush ribs (not shown). The upper intermediate portions 170 extend across the housing interface between the front and rear housing members 130, 132.

Each lower contact 182 includes a lower intermediate portion 190 located between a lower front mating beam 192 and an lower rear mating beam 194. The lower front mating beam 192 is configured to extend into the front receptacle 110 to mate with the first module circuit board 22. The lower rear mating beam 194 is configured to extend into the rear receptacle 112 to mate with the second module circuit board 32. The mating beams 192, 194 are deflectable. The mating beams 192, 194 have separable mating interfaces. Optionally, the mating beams 192, 194 may be curved at the separable mating interfaces and flared outward to provide a lead-in surfaces to prevent stubbing during mating. The lower contact holder 184 is coupled to the lower intermediate portion 190. The lower front mating beam 192 extends forward from the lower contact holder 184. The lower rear mating beam 194 extends rearward from the lower contact holder 184. Optionally, the lower contact holder 184 may include a front member and a rear member separated from each other by a gap 186. The lower intermediate portion 190 extends between the front member and the rear member across the gap 186. The front member is configured to be coupled to the front member of the upper contact holder 164 and the rear member is configured to be coupled to the rear member of the upper contact holder 164. For example, the upper and lower contact holders 164, 184 may include posts and openings to locate and secure the upper and lower contact holders 164, 184 together by an interference fit. Optionally, the upper and lower contact holders 164, 184 may be hermaphroditic including both posts and openings that are aligned with each other when inverted relative to each other. The front member is configured to be loaded into the pocket 134 of the front housing member 130 and is held in the pocket 134 by the crush ribs 136. The rear member is configured to be loaded into the pocket (not shown) of the rear housing member 132 and is held in the pocket by crush ribs (not shown). The lower intermediate portions 190 extend across the housing interface between the front and rear housing members 130, 132.

Figure 5:
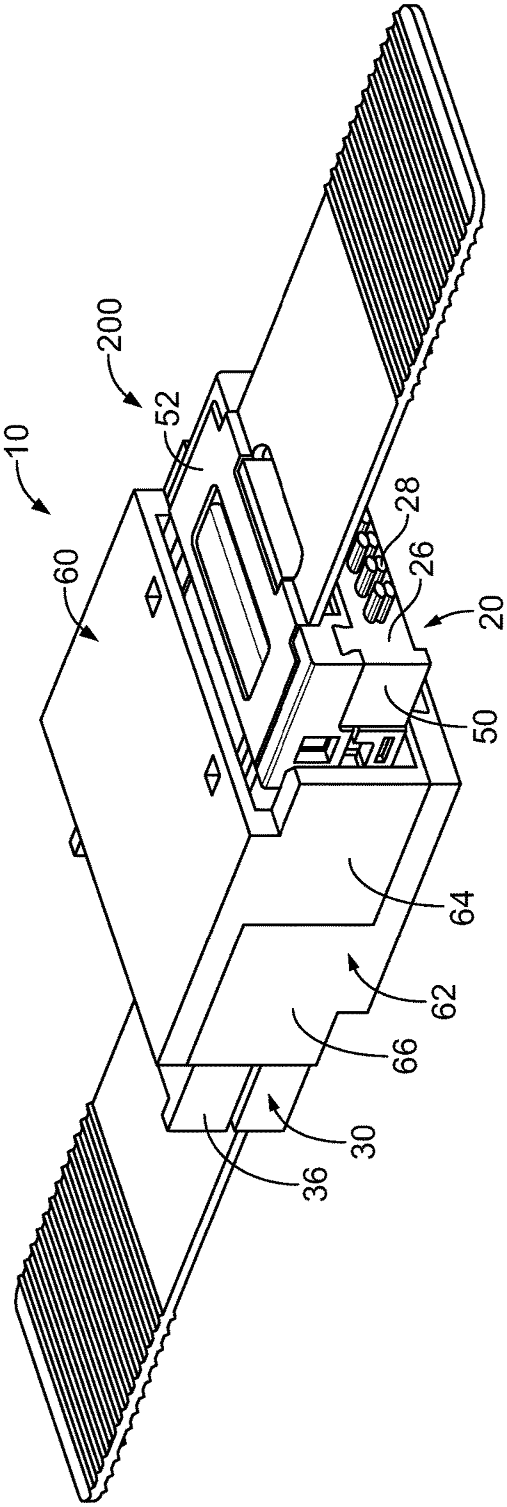
FIG. 5 is a top, front perspective view of the communication system including a receptacle coupler in accordance with an exemplary embodiment.
Figure 6:
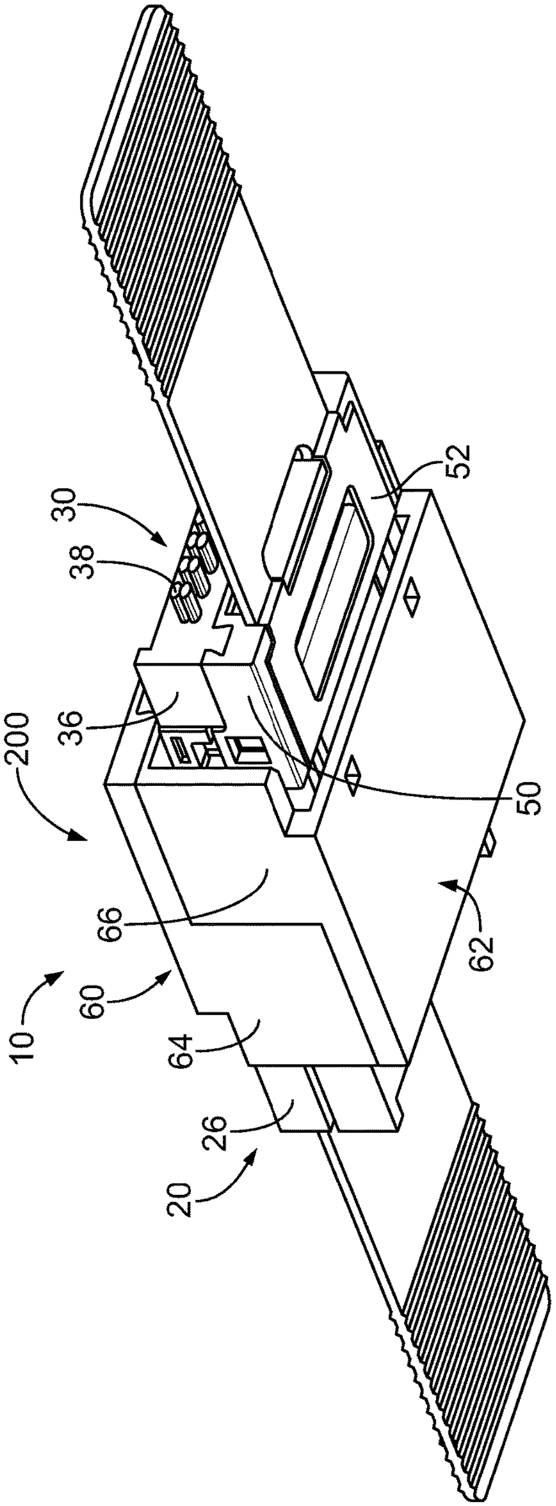
FIG. 6 is a bottom, rear perspective view of the communication system including the receptacle coupler in accordance with an exemplary embodiment.

FIG. 5 is a top, front perspective view of the communication system 10 including a receptacle coupler 200 in accordance with an exemplary embodiment. FIG. 6 is a bottom, rear perspective view of the communication system 10 including the receptacle coupler 200 in accordance with an exemplary embodiment. The receptacle coupler 200 is an exemplary embodiment of the receptacle coupler 12 used to electrically connect the pluggable modules 20, 30.

In the illustrated embodiment, the pluggable modules 20, 30 are plug connectors 26, 36 provided at ends of cables 28, 38 configured to be directly plugged into the receptacle coupler 200. The pluggable modules 20, 30 may be similar to each other and like components may be identified with like reference numerals. The plug connector 26 includes a plug housing 50 and a latch 52 coupled to the plug housing 50. The plug housing 50 holds the module circuit board 22. The cables 28 are terminated to the module circuit board 22 (for example, soldered) within the plug housing 50. The plug housing 50 may provide strain relief for the cables 28. The latch 52 is used to secure the plug connector 26 to a support structure 60 and/or the receptacle coupler 200.

In the illustrated embodiment, the support structure 60 includes an outer shroud 62, rather than the panel (shown in FIG. 2). The outer shroud 62 surrounds the receptacle coupler 200 and portions of the pluggable modules 20, 30, such as the plug connectors of the pluggable modules 20, 30. The latch 52 is latchably coupled to the outer shroud 62, such as being latchably received in openings in the outer shroud 62. Optionally, the outer shroud 62 may be a multi-piece structure, such as including a front shroud 64 and a rear shroud 66. Alternatively, the outer shroud 62 may be a single piece structure.

Figure 7:
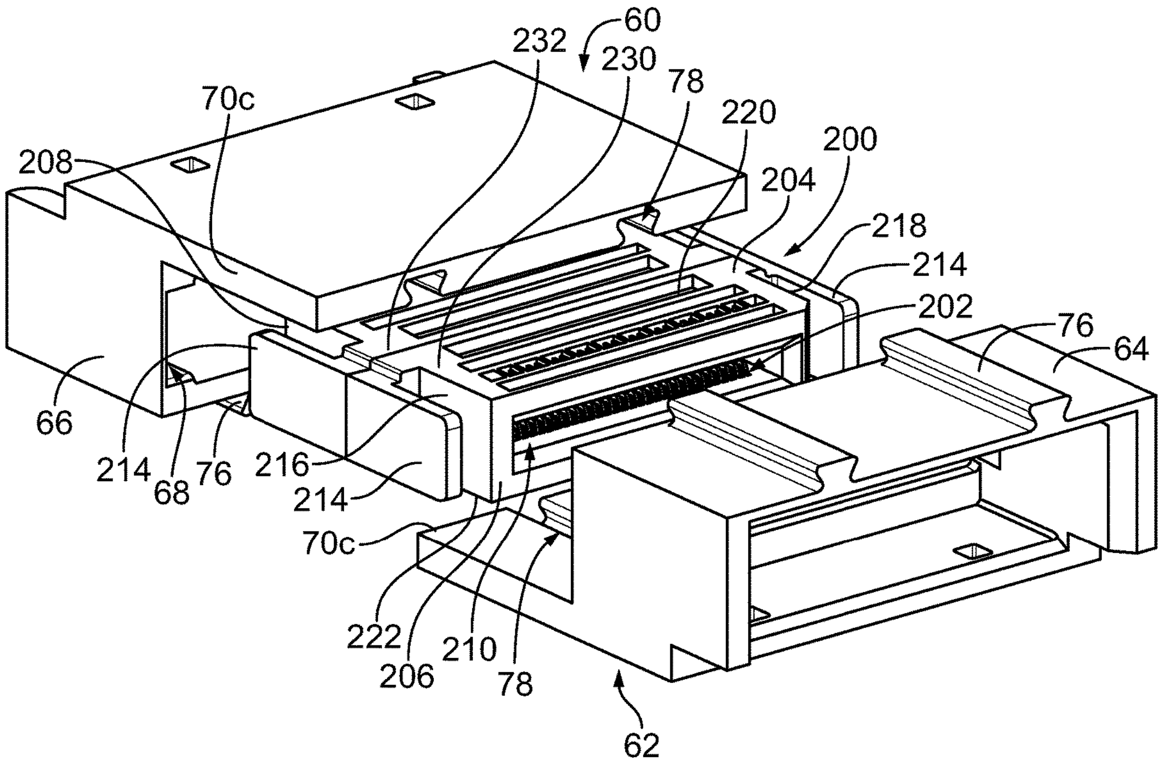
FIG. 7 is an exploded view of the receptacle coupler in accordance with an exemplary embodiment.
Figure 8:
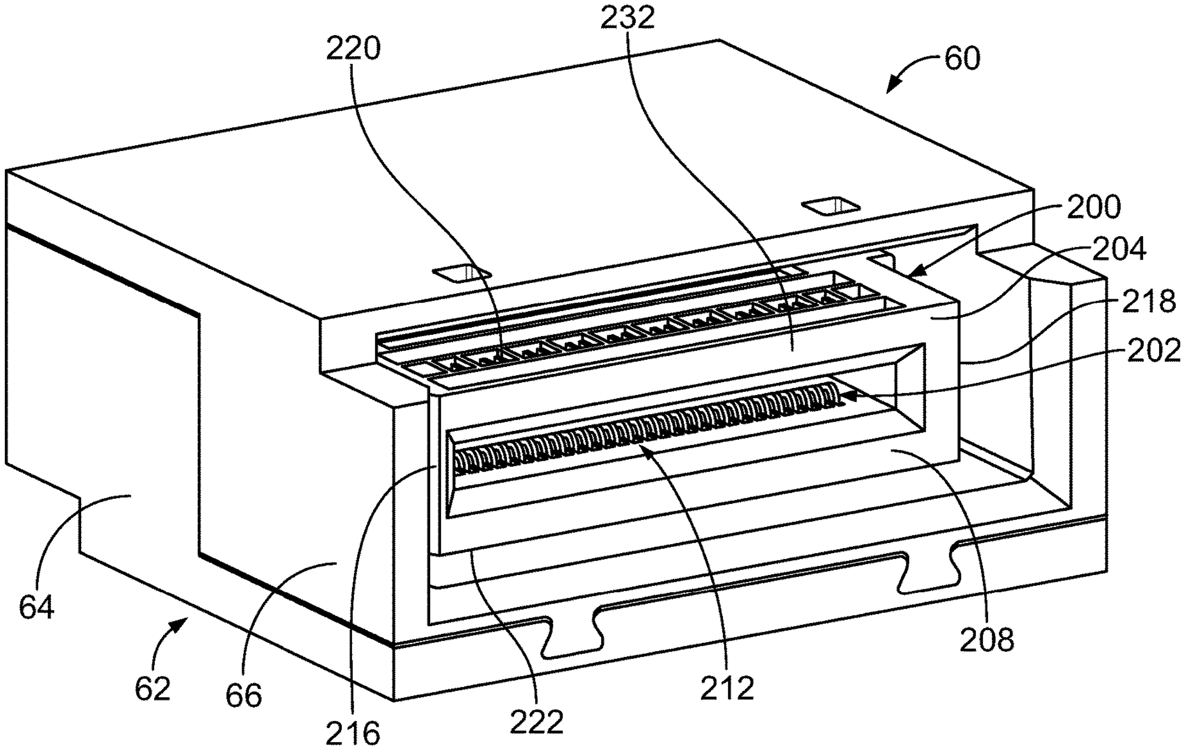
FIG. 8 is an assembled view of the receptacle coupler in accordance with an exemplary embodiment.

FIG. 7 is a front, exploded view of the receptacle coupler 200 in accordance with an exemplary embodiment. FIG. 8 is a rear, assembled view of the receptacle coupler 200 in accordance with an exemplary embodiment. The receptacle coupler 200 includes a coupler contact assembly 202 and a coupler housing 204 that receives the coupler contact assembly 202. The coupler housing 204 is received in the front and rear shrouds 64, 66 of the outer shroud 62 of the receptacle coupler 200. The coupler housing 204 is manufactured from a dielectric material, such as a plastic material. In various embodiments, the coupler housing 204 may include multiple pieces, such as a front housing member 230 and a rear housing member 232 coupled together to contain the coupler contact assembly 202 therebetween. In alternative embodiments, the coupler housing 204 may be a single piece housing.

The coupler housing 204 extends between a front 206 and a rear 208. In an exemplary embodiment, the coupler housing 204 includes a front receptacle 210 (FIG. 7) at the front 206 and a rear receptacle 212 (FIG. 8) at the rear 208. The coupler contact assembly 202 extends into the front receptacle 210 and the rear receptacle 212. The front receptacle 210 defines a card slot configured to receive the card edge 46 (FIG. 2) of the first module circuit board 22. The rear receptacle 212 defines a card slot configured to receive the card edge 46 (FIG. 2) of the second module circuit board 32.

In an exemplary embodiment, the coupler housing 204 includes mounting tabs 214 (FIG. 7) extending from opposite sides 216, 218 of the coupler housing 204. In the illustrated embodiment, the mounting tabs 214 extend forward from the front housing member 230 and the mounting tabs 214 extend rearward from the rear housing member 232. The mounting tabs 214 are used to secure the receptacle coupler 200 to the support structure 60. The mounting tabs 214 are received in pockets 68 in the front and rear shrouds 64, 66. Other securing means may be used in alternative embodiments, such as latches, clips, fasteners, and the like. In alternative embodiments, the mounting tabs 214 may extend from a top 220 and/or a bottom 222 of the coupler housing 204.

Figure 9:
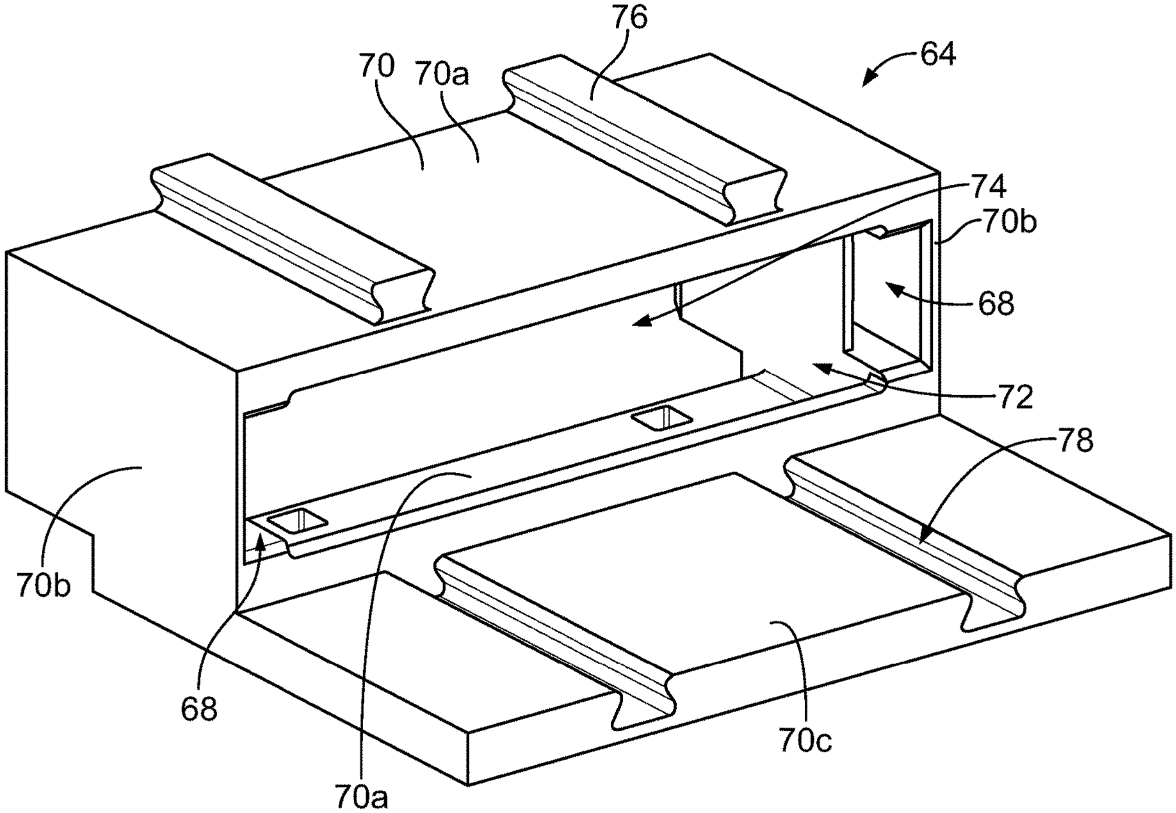
FIG. 9 is a perspective view of the front shroud in accordance with an exemplary embodiment area in an exemplary embodiment.

FIG. 9 is a perspective view of the front shroud 64 in accordance with an exemplary embodiment area in an exemplary embodiment, the rear shroud 66 (shown in FIG. 7) is similar to the front shroud 64 and like components may be identified with like reference numerals. Optionally, the rear shroud 66 may be identical to the front shroud 64. The front shroud 64 is manufactured from a dielectric material, such as a plastic material. The front shroud 64 may be molded, such as by an injection molding process. Optionally, the front shroud 64 may be at least partially manufactured from a conductive material, such as a plated coating or from a diecast metal material, such that the front shroud 64 provide electrical shielding for the receptacle coupler 200.

The front shroud 64 includes walls 70 surrounding a coupler cavity 72 and the plug cavity 74. The plug cavity 74 is provided at the mating end to receive the pluggable module. The front shroud 64 may include latching features, such as openings in one or more of the walls 70 to latchably secure the pluggable module to the front shroud 64. The coupler cavity 72 is configured to receive the coupler housing 204 (shown in FIG. 7). In an exemplary embodiment, the front shroud 64 is generally rectangular defined by a pair of opposite end walls 70*a* and a pair of opposite side walls 70*b* extending between the end walls 70*a*. Optionally, the pockets 68 are formed in the side walls 70*b* to receive the mounting tabs of the coupler housing 204. The end walls 70*a* may form top walls and bottom walls of the front shroud 64. In an exemplary embodiment, one of the end walls 70*a* is elongated forming an extension wall 70*c*.

In an exemplary embodiment, the front shroud 64 includes securing features used to secure the front shroud 64 to the rear shroud 66. In the illustrated embodiment, the securing features include rails 76 and tracks 78. The rails 76 extend from one of the end walls 70*a*. The tracks 78 are formed in the extension wall 70*c*. When the front shroud 64 is coupled to the rear shroud 66, the tracks 78 receive the rails of the rear shroud, while the rails 76 are received in corresponding tracks of the rear shroud 66. In an exemplary embodiment, the front and rear shrouds 64, 66 are hermaphroditic. Other types of securing features may be provided in alternative embodiments.

Figure 10:
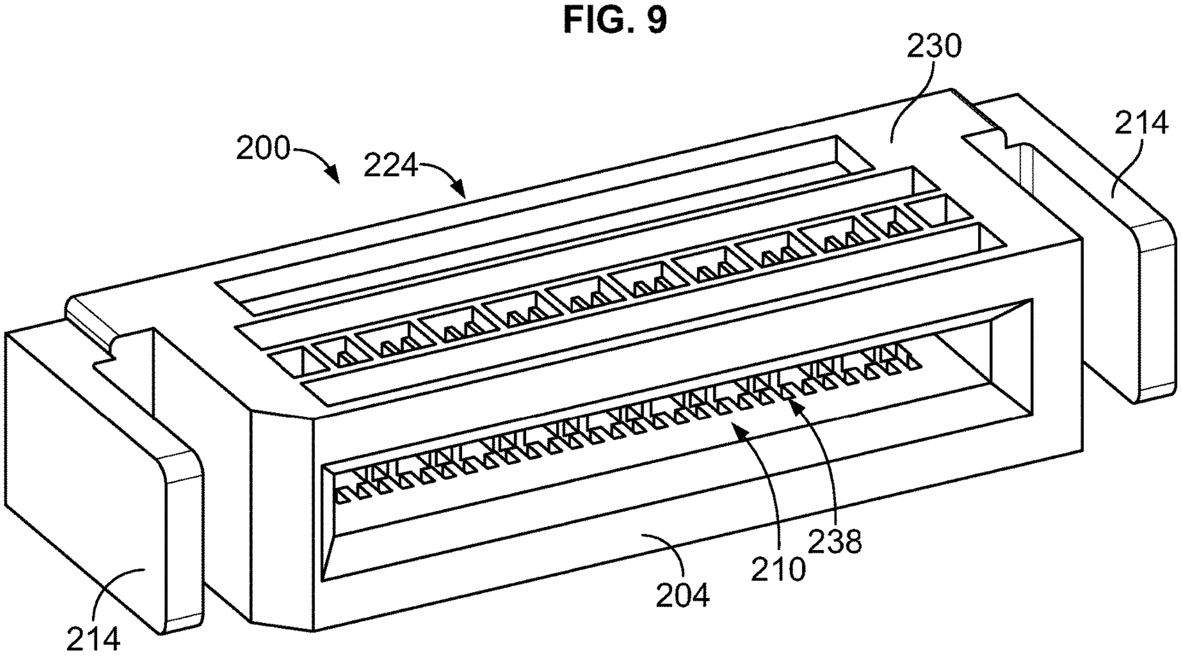
FIG. 10 is a front perspective view of a portion of the coupler housing showing the front housing member in accordance with an exemplary embodiment.

FIG. 10 is a front perspective view of a portion of the coupler housing 204 showing the front housing member 230 in accordance with an exemplary embodiment. The rear housing member 232 (shown in FIG. 7) may be similar to the front housing member 230 and like components may be identified with like reference numerals. The front housing member 230 forms part of a contact chamber 224 that receives the coupler contact assembly 202. The front receptacle 210 forms part of the contact chamber 224.

In an exemplary embodiment, the front housing member 230 includes contact channels 238 that receive contacts of the coupler contact assembly 202. The contact channels 238 extend along the front receptacle 210 such that the contacts of the coupler contact assembly 202 may extend from the contact channels 238 into the front receptacle 210. The contact channels 238 may be used to position and/or electrically isolate the contacts from each other.

The front housing member 230 includes a pair of the mounting tabs 214. The mounting tabs 214 are provided at the opposite sides of the front housing member 230. The mounting tabs 214 extend generally parallel to a mating direction for mating the receptacle coupler 200 with the pluggable module. For example, the mounting tabs 214 extend parallel to the front receptacle 210 in the contact channels 238. The mounting tabs 214 are used to secure the receptacle coupler 100 to the front shroud 64 (shown in FIG. 9). For example, the mounting tabs 214 may be received in the pockets 68. Other securing means may be used in alternative embodiments, such as latches, clips, interference fit features, fasteners and the like.

Figure 11:
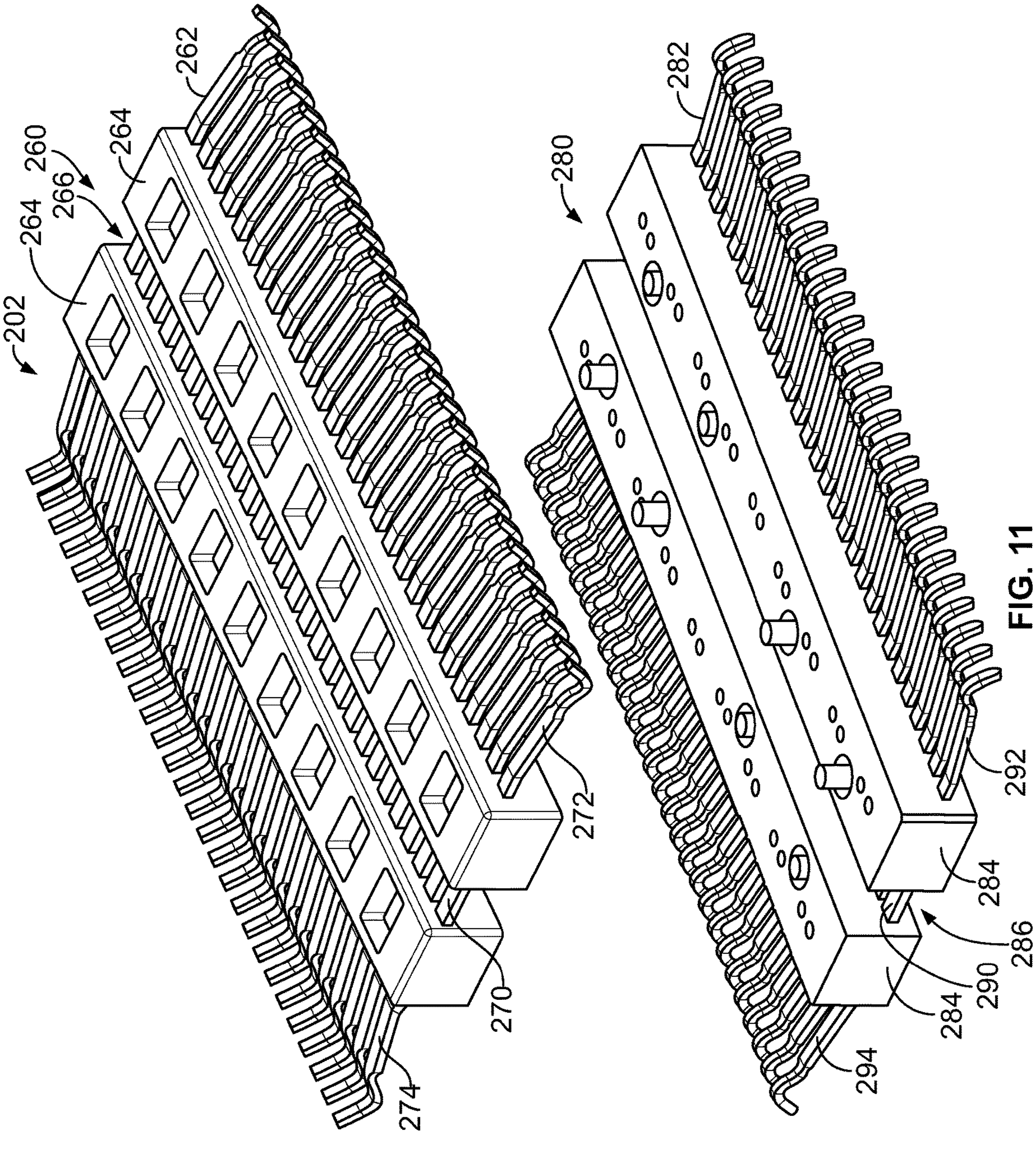
FIG. 11 is an exploded view of the coupler contact assembly in accordance with an exemplary embodiment.

FIG. 11 is an exploded view of the coupler contact assembly 202 in accordance with an exemplary embodiment. The coupler contact assembly 202 includes an upper contact array 260 and a lower contact array 280. The upper contact array 260 includes a plurality of upper contacts 262 held together by one or more upper contact holders 264. In an exemplary embodiment, the upper contacts 262 may be stamped and formed contacts formed from a lead frame. The upper contact holders 264 are manufactured from a dielectric material, such as a plastic material. Optionally, the upper contact holders 264 may be overmolded over the lead frame to hold the upper contacts 262 relative to each other prior to removing the lead frame from the carrier strip formed with the lead frame during the stamping process. Alternatively, the upper contacts 262 may be individually loaded into the upper contact holders 264 during an assembly process.

The lower contact array 280 includes a plurality of lower contacts 282 held together by one or more lower contact holders 284. In an exemplary embodiment, the lower contacts 282 may be stamped and formed contacts formed from a lead frame. The lower contact holders 284 are manufactured from a dielectric material, such as a plastic material. Optionally, the lower contact holders 284 may be overmolded over the lead frame to hold the lower contacts 282 relative to each other prior to removing the lead frame from the carrier strip formed with the lead frame during the stamping process. Alternatively, the lower contacts 282 may be individually loaded into the lower contact holders 284 during an assembly process. Optionally, the upper contact array 260 and the lower contact array 280 may be identical to each other and inverted 180° relative to each other to form the coupler contact assembly 202.

Each upper contact 262 includes an upper intermediate portion 270 located between an upper front mating beam 272 and an upper rear mating beam 274. The upper front mating beam 272 is configured to extend into the front receptacle 210 to mate with the first module circuit board 22. The upper rear mating beam 274 is configured to extend into the rear receptacle 212 to mate with the second module circuit board 32. The mating beams 272, 274 are deflectable. The mating beams 272, 274 have separable mating interfaces. Optionally, the mating beams 272, 274 may be curved at the separable mating interfaces and flared outward to provide a lead-in surfaces to prevent stubbing during mating. The upper contact holder 264 is coupled to the upper intermediate portion 270. The upper front mating beam 272 extends forward from the upper contact holder 264. The upper rear mating beam 274 extends rearward from the upper contact holder 264. Optionally, the upper contact holder 264 may include a front member and a rear member separated from each other by a gap 266. The upper intermediate portion 270 extends between the front member and the rear member across the gap 266. The front member is configured to be loaded into the front housing member 230 and is held therein by crush ribs or other interference features. The upper intermediate portions 270 extend across the housing interface 234 between the front and rear housing members 230, 232.

Each lower contact 282 includes a lower intermediate portion 290 located between a lower front mating beam 292 and a lower rear mating beam 294. The lower front mating beam 292 is configured to extend into the front receptacle 210 to mate with the first module circuit board 22. The lower rear mating beam 294 is configured to extend into the rear receptacle 212 to mate with the second module circuit board 32. The mating beams 292, 294 are deflectable. The mating beams 292, 294 have separable mating interfaces. Optionally, the mating beams 292, 294 may be curved at the separable mating interfaces and flared outward to provide a lead-in surfaces to prevent stubbing during mating. The lower contact holder 284 is coupled to the lower intermediate portion 290. The lower front mating beam 292 extends forward from the lower contact holder 284. The lower rear mating beam 294 extends rearward from the lower contact holder 284. Optionally, the lower contact holder 284 may include a front member and a rear member separated from each other by a gap 286. The lower intermediate portion 290 extends between the front member and the rear member across the gap 286. The front member is configured to be coupled to the front member of the upper contact holder 264 and the rear member is configured to be coupled to the rear member of the upper contact holder 264. For example, the upper and lower contact holders 264, 284 may include posts and openings to locate and secure the upper and lower contact holders 264, 284 together by an interference fit. Optionally, the upper and lower contact holders 264, 284 may be hermaphroditic including both posts and openings that are aligned with each other when inverted relative to each other. The front member is configured to be loaded into the front housing member 230 and is held therein by crush ribs or other interference features. The lower intermediate portions 290 extend across the housing interface 234 between the front and rear housing members 230, 232.

Returning to FIG. 7, during assembly, the coupler contact assembly 202 is loaded into the coupler housing 204. The coupler contact assembly 202 extends into the front housing member 230 and the rear housing member 232. The coupler housing 204 is configured to be loaded into the outer shroud 62. For example, the front housing member 230 is loaded into the front shroud 64 and the rear housing member 232 is loaded into the rear shroud 66. The mounting tabs 214 are received in the pockets 68. The outer shroud 62 is assembled by coupling the front shroud 64 to the rear shroud 66. The rear shroud 66 is inverted relative to the front shroud 64. The extension 70*c* of the front shroud 64 extends along the top of the coupler housing 204 and the extension 70*c* of the rear shroud 66 extends along the bottom of the coupler housing 204. The rails 76 of the front shroud 64 are aligned with and configured to be received in the tracks 78 of the rear shroud 66. The rails 76 of the rear shroud 66 are aligned with and configured to be received in the tracks 78 of the front shroud 64. When assembled, the outer shroud 62 surrounds the coupler housing 204.

Figure 12:
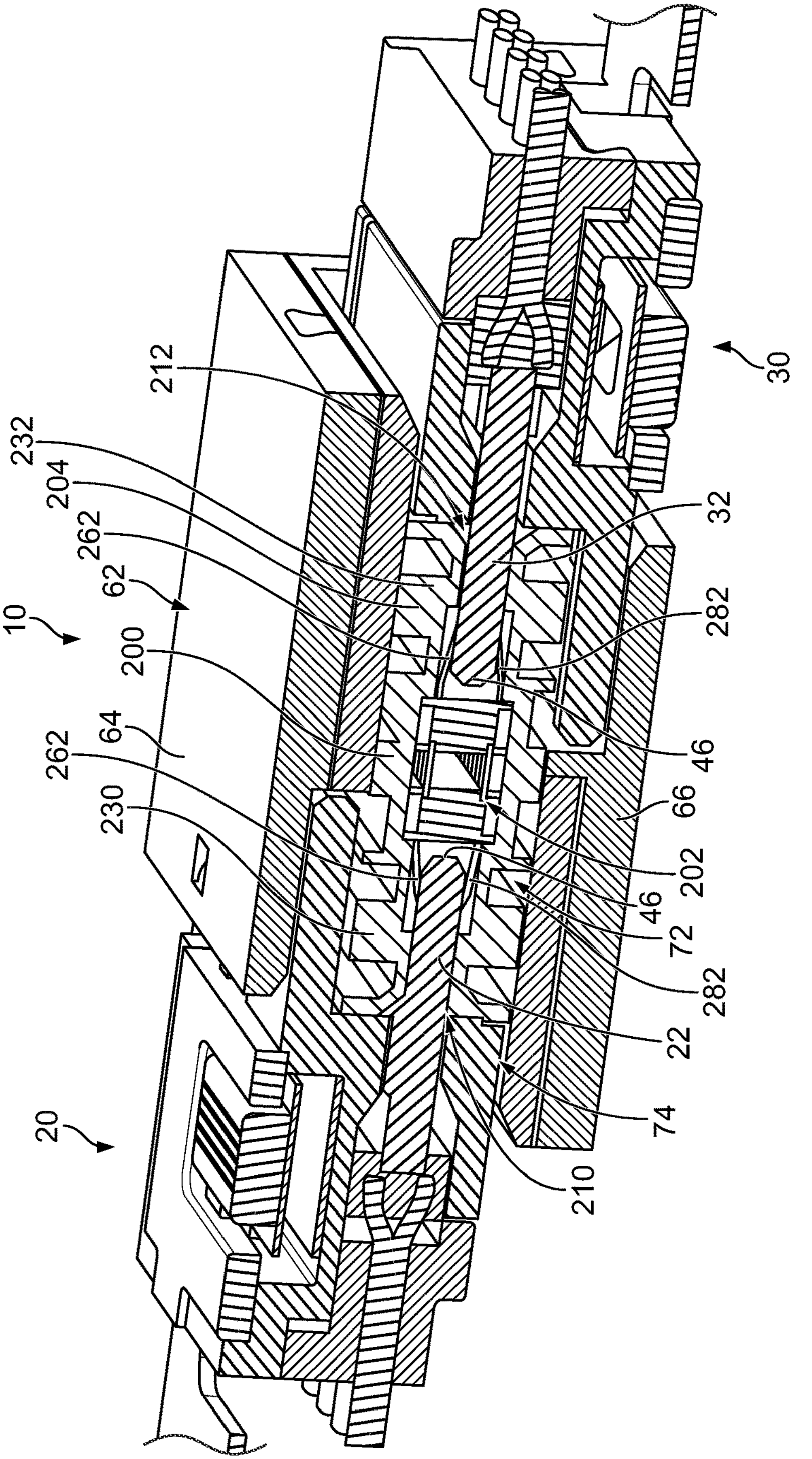
FIG. 12 is a cross-sectional view of the communication system in accordance with an exemplary embodiment.

FIG. 12 is a cross-sectional view of the communication system 10 in accordance with an exemplary embodiment showing the first and second pluggable modules 20, 30 coupled to the receptacle coupler 200. The receptacle coupler 200 electrically connects the first and second pluggable modules 20, 30. The outer shroud 62 surrounds the coupler housing 204. The front housing member 230 extends into the coupler cavity 72 of the front shroud 64. The rear housing member 232 extends into the coupler cavity 72 of the rear shroud 66. The plug cavity 74 of the front shroud 64 receives the first pluggable module 20. The plug cavity 74 of the rear shroud 66 receives the second pluggable module 30. In the illustrated embodiment, the second pluggable module 30 is received in the receptacle coupler 200 inverted relative to the first pluggable module 20. For example, the second pluggable module 30 is turned upside down when mated to the receptacle coupler 200. Other orientations are possible in alternative embodiments.

The coupler contact assembly 202 is arranged in the coupler housing 204 such that the upper contacts 262 and the lower contacts 282 are configured to be coupled to the first and second pluggable modules 20, 30. For example, the upper contact 262 and the lower contacts 282 are mated with the first and second module circuit boards 22, 32 with the pluggable modules 20, 30 are coupled to the receptacle coupler 200. The card edge 46 of each module circuit board 22, 32 is received in the front receptacle 210 and the rear receptacle 212, respectively.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A receptacle coupler comprising:

a coupler contact assembly having upper contacts and lower contacts arranged in an upper array and a lower array, each upper contact having an upper front mating beam configured to mate with a front module circuit board and an upper rear mating beam configured to mate with a rear module circuit board, each upper contact having an upper intermediate portion between the upper front mating beam and the upper rear mating beam, each lower contact having a lower front mating beam configured to mate with the front module circuit board and a lower rear mating beam configured to mate with the rear module circuit board, each lower contact having a lower intermediate portion between the lower front mating beam and the lower rear mating beam, the coupler contact assembly including a contact holder holding the upper and lower contacts;

a coupler housing having a contact chamber receiving the coupler contact assembly, the coupler housing having a front receptacle defined by walls of the coupler housing forming a front card slot configured to receive and position the front module circuit board in the front receptacle, the coupler housing having a rear receptacle defined by walls of the coupler housing forming a rear card slot configured to receive and position the rear module circuit board in the rear receptacle, the coupler housing holding the coupler contact assembly such that the upper and lower front mating beams are located in the front receptacle and surrounded by the coupler housing for mating with the front module circuit board and such that the upper and lower rear mating beams are located in the rear receptacle and surrounded by the coupler housing for mating with the rear module circuit board, the coupler housing including mounting tabs extending from the coupler housing for mounting the coupler housing to a support structure;

wherein the walls of the coupler housing defining the front receptacle and the upper and lower contacts define a front mating interface configured to pluggably receive the front module circuit board and wherein the walls of the coupler housing defining the rear receptacle and the upper and lower contacts define a rear mating interface configured to pluggably receive the rear module circuit board, the front and rear mating interfaces being identical;

wherein the mounting tabs include front fingers extending forward from a front of the coupler housing and rear fingers extending rearward from a rear of the coupler housing, the front fingers being received in a front shroud to locate the coupler housing in the front shroud, the rear fingers being received in a rear shroud to locate the coupler housing in the rear shroud.

2. The receptacle coupler of claim 1, wherein the upper contacts are formed from an upper leadframe and the lower contacts are formed from a lower leadframe inverted 180° relative to each other.

3. The receptacle coupler of claim 1, wherein the contact holder is overmolded over the upper contacts and the lower contacts.

4. The receptacle coupler of claim 1, wherein the contact holder includes an upper holder member and a lower holder member, the upper and lower members being coupled to each other to form the contact holder.

5. The receptacle coupler of claim 1, wherein the contact holder includes a front holder member and a rear holder member, the front and rear holder members being spaced apart from each other by a gap, the upper and lower intermediate portions extending across the gap between the front and rear holder members.

6. The receptacle coupler of claim 1, wherein the coupler housing includes a front housing member and a rear housing member coupled together at a housing interface, the front housing member forming the front receptacle, the rear housing member forming the rear receptacle, the upper and lower contacts extending into the front housing member and the rear housing member, the upper and lower intermediate portions extending across the housing interface.

7. The receptacle coupler of claim 6, wherein the front and rear housings are identical and coupled together at the housing interface to face in opposite directions.

8. The receptacle coupler of claim 6, wherein the contact holder includes a front holder member received in the front housing member and a rear holder member received in the rear housing member.

9. The receptacle coupler of claim 8, wherein the front housing member includes a locating feature and the front holder member includes a locating feature, the locating feature of the front holder member engaging the locating feature of the front housing member to locate the upper and lower front mating beams within the front receptacle, and wherein the rear housing member includes a locating feature and the rear holder member includes a locating feature, the locating feature of the rear holder member engaging the locating feature of the rear housing member to locate the upper and lower rear mating beams within the rear receptacle.

10. The receptacle coupler of claim 1, wherein the mounting tabs are provided at first and second sides of the coupler housing, the mounting tabs including openings configured to receive a fastener for securing the mounting tabs to the support structure.

11. The receptacle coupler of claim 1, further comprising an outer shroud having a coupler cavity, the coupler housing being received in the coupler cavity, the mounting tabs engaging the outer shroud to couple the coupler housing to the outer shroud.

12. The receptacle coupler of claim 1, further comprising an outer shroud having a coupler cavity, the coupler housing being received in the coupler cavity, the outer shroud having a front plug cavity at a front of the outer shroud and a rear plug cavity at a rear of the outer shroud, the front plug cavity receiving the front module circuit board, the rear plug cavity receiving the rear module circuit board.

13. The receptacle coupler of claim 12, wherein the front plug cavity is configured to receive a front plug connector holding the front module circuit board such that the front module circuit board is received in the front receptacle when the front plug connector is plugged into the front plug cavity, and wherein the rear plug cavity is configured to receive a rear plug connector holding the rear module circuit board such that the rear module circuit board is received in the rear receptacle when the rear plug connector is plugged into the rear plug cavity.

14. A receptacle coupler comprising:

a coupler contact assembly having upper contacts and lower contacts arranged in an upper array and a lower array, each upper contact having an upper front mating beam configured to mate with a front module circuit board and an upper rear mating beam configured to mate with a rear module circuit board, each upper contact having an upper intermediate portion between the upper front mating beam and the upper rear mating beam, each lower contact having a lower front mating beam configured to mate with the front module circuit board and a lower rear mating beam configured to mate with the rear module circuit board, each lower contact having a lower intermediate portion between the lower front mating beam and the lower rear mating beam, the coupler contact assembly including a contact holder holding the upper and lower contacts;

a coupler housing having a contact chamber receiving the coupler contact assembly, the coupler housing having a front receptacle defined by walls of the coupler housing forming a front card slot configured to receive and position the front module circuit board in the front receptacle, the coupler housing having a rear receptacle defined by walls of the coupler housing forming a rear card slot configured to receive and position the rear module circuit board in the rear receptacle, the coupler housing holding the coupler contact assembly such that the upper and lower front mating beams are located in the front receptacle and surrounded by the coupler housing for mating with the front module circuit board and such that the upper and lower rear mating beams are located in the rear receptacle and surrounded by the coupler housing for mating with the rear module circuit board, the coupler housing including mounting tabs extending from the coupler housing for mounting the coupler housing to a support structure; and an outer shroud having a coupler cavity receiving the coupler housing and the coupler contact assembly, the outer shroud having a front shroud member and a rear shroud member, the front shroud member forming a front plug cavity configured to receive a front plug connector holding the front module circuit board, the rear shroud member forming a rear plug cavity configured to receive a rear plug connector holding the front module circuit board, the front shroud member having a front rail and a front track, the rear shroud member having a rear rail and a rear track, the front shroud member coupled to the rear shroud member such that the front rail is received in the rear track and such that the rear rail is received in the front track;

wherein the walls of the coupler housing defining the front receptacle and the upper and lower contacts define a front mating interface configured to pluggably receive the front module circuit board and wherein the walls of the coupler housing defining the rear receptacle and the upper and lower contacts define a rear mating interface configured to pluggably receive the rear module circuit board, the front and rear mating interfaces being identical.

15. The receptacle coupler of claim 14, wherein the mounting tabs include front fingers extending forward from a front of the coupler housing and rear fingers extending rearward from a rear of the coupler housing, the front fingers being received in a front shroud to locate the coupler housing in the front shroud, the rear fingers being received in a rear shroud to locate the coupler housing in the rear shroud.

16. A receptacle coupler comprising:

a coupler contact assembly having upper contacts and lower contacts arranged in an upper array and a lower array, each upper contact having an upper front mating beam configured to mate with a front module circuit board of a front plug connector and an upper rear mating beam configured to mate with a rear module circuit board of a rear plug connector, each upper contact having an upper intermediate portion between the upper front mating beam and the upper rear mating beam, each lower contact having a lower front mating beam configured to mate with the front module circuit board and a lower rear mating beam configured to mate with the rear module circuit board, each lower contact having a lower intermediate portion between the lower front mating beam and the lower rear mating beam, the coupler contact assembly including a contact holder holding the upper and lower contacts;

a coupler housing having a contact chamber receiving the coupler contact assembly, the coupler housing having a front receptacle configured to receive the front module circuit board, the coupler housing having a rear receptacle configured to receive the rear module circuit board, the coupler housing holding the coupler contact assembly such that the upper and lower front mating beams are located in the front receptacle for mating with the front module circuit board and such that the upper and lower rear mating beams are located in the rear receptacle for mating with the rear module circuit board, the coupler housing including mounting tabs extending from the coupler housing; and an outer shroud having a coupler cavity receiving the coupler housing and the coupler contact assembly, the mounting tabs engaging the outer shroud to couple the coupler housing to the outer shroud, the outer shroud having a front shroud member and a rear shroud member, the front shroud member forming a front plug cavity configured to receive the front plug connector, the rear shroud member forming a rear plug cavity configured to receive the rear plug connector, the front shroud member having a front rail and a front track, the rear shroud member having a rear rail and a rear track, the front shroud member coupled to the rear shroud member such that the front rail is received in the rear track and such that the rear rail is received in the front track.

17. A communication system comprising:

a front pluggable module having a front module circuit board, the front module circuit board having a card edge;

a rear pluggable module having a rear module circuit board, the rear module circuit board having a card edge; and a receptacle coupler electrically coupling the front pluggable module and the rear pluggable module, the receptacle coupler comprising:

a coupler contact assembly having upper contacts and lower contacts arranged in an upper array and a lower array, each upper contact having an upper front mating beam and an upper rear mating beam, each upper contact having an upper intermediate portion between the upper front mating beam and the upper rear mating beam, each lower contact having a lower front mating beam and a lower rear mating beam, each lower contact having a lower intermediate portion between the lower front mating beam and the lower rear mating beam, the coupler contact assembly including a contact holder holding the upper and lower contacts; and a coupler housing having a contact chamber receiving the coupler contact assembly, the coupler housing having a front receptacle defined by walls of the coupler housing forming a front card slot receiving the card edge of the front module circuit board and positioning the front module circuit board in the front receptacle, the coupler housing having a rear receptacle defined by walls of the coupler housing forming a rear card slot receiving the card edge of the rear module circuit board and positioning the rear module circuit board in the rear receptacle, the coupler housing holding the coupler contact assembly such that the upper and lower front mating beams are located in the front receptacle and surrounded by the coupler housing for mating with the front module circuit board and such that the upper and lower rear mating beams are located in the rear receptacle and surrounded by the coupler housing for mating with the rear module circuit board, the coupler housing including mounting tabs extending from the coupler housing for mounting the coupler housing to a support structure;

wherein the walls of the coupler housing defining the front receptacle and the upper and lower contacts define a front mating interface configured to pluggably receive the front module circuit board and wherein the walls of the coupler housing defining the rear receptacle and the upper and lower contacts define a rear mating interface configured to pluggably receive the rear module circuit board, the front and rear mating interfaces being identical;

wherein the mounting tabs include front fingers extending forward from a front of the coupler housing and rear fingers extending rearward from a rear of the coupler housing, the front fingers being received in a front shroud to locate the coupler housing in the front shroud, the rear fingers being received in a rear shroud to locate the coupler housing in the rear shroud.

18. The communication system of claim 17, wherein the front pluggable module includes a front plug connector having a front plug housing holding the front module circuit board, and wherein the rear pluggable module includes a rear plug connector having a rear plug housing holding the rear module circuit board.

19. The communication system of claim 17, wherein the receptacle coupler further comprises an outer shroud having a coupler cavity receiving the coupler housing and the coupler contact assembly, the outer shroud having a front shroud member and a rear shroud member, the front shroud member forming a front plug cavity receiving the front plug connector, the rear shroud member forming a rear plug cavity receiving the rear plug connector.

* * * * *